United States Patent
Bezanson et al.

(10) Patent No.: US 7,660,847 B2
(45) Date of Patent: Feb. 9, 2010

(54) UNATTENDED INSTALLATION OF DRIVERS FOR DEVICES THAT ARE NOT AUTOMATICALLY FOUND AND INSTALLED DURING OPERATING SYSTEM INSTALLATION

(75) Inventors: James T. Bezanson, Snohomish, WA (US); Giai V. Yen, Seattle, WA (US); Rhonda V. Seiher Doane, Bethell, WA (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 10/800,975

(22) Filed: Mar. 14, 2004

(65) Prior Publication Data

US 2005/0204363 A1 Sep. 15, 2005

(51) Int. Cl.
*G06F 15/16* (2006.01)
*G06F 12/00* (2006.01)
*G06F 17/30* (2006.01)

(52) U.S. Cl. .......... 709/203; 707/205
(58) Field of Classification Search .......... None
See application file for complete search history.

(56) References Cited

U.S. PATENT DOCUMENTS

| | | | |
|---|---|---|---|
| 5,421,009 A * | 5/1995 | Platt | 709/221 |
| 6,442,683 B1 | 8/2002 | Fleming, III | |
| 6,567,860 B1 * | 5/2003 | Maxwell et al. | 719/327 |
| 6,594,674 B1 * | 7/2003 | Kaplan et al. | 707/104.1 |
| 7,107,330 B1 * | 9/2006 | Hamilton et al. | 709/221 |
| 2002/0069353 A1 * | 6/2002 | Smith | 713/1 |
| 2003/0023770 A1 * | 1/2003 | Barmettler et al. | 709/327 |
| 2003/0046678 A1 | 3/2003 | Boxall et al. | |
| 2003/0120624 A1 * | 6/2003 | Poppenga et al. | 707/1 |
| 2003/0195951 A1 * | 10/2003 | Wittel et al. | 709/220 |
| 2007/0220512 A1 * | 9/2007 | Pfahler | 717/177 |

OTHER PUBLICATIONS

Jeffrey A. Ferris, Windows 2000 Deployment & Desktop Management, year 2000, pp. 63-85.

* cited by examiner

*Primary Examiner*—Ario Etienne
*Assistant Examiner*—Ho Shiu
(74) *Attorney, Agent, or Firm*—Jason O. Piche

(57) ABSTRACT

The unattended installation of drivers for devices that are not automatically found and installed during operating system installation is disclosed. A method determines which drivers are needed for devices on client computing systems that are not automatically found and installed during operating system installation. Entries for the drivers are created within a master driver file. The method copies the master driver file to each client computing system, and drivers that are needed for the devices. For each client computing system, references are created within an unattended installation file to the entries for the drivers within the master driver file. Operating systems are remotely installed on the client computing systems in an unattended manner. The drivers are able to be installed in the unattended manner due to the references created within the unattended installation files to the entries for the drivers within the master driver file.

8 Claims, 4 Drawing Sheets

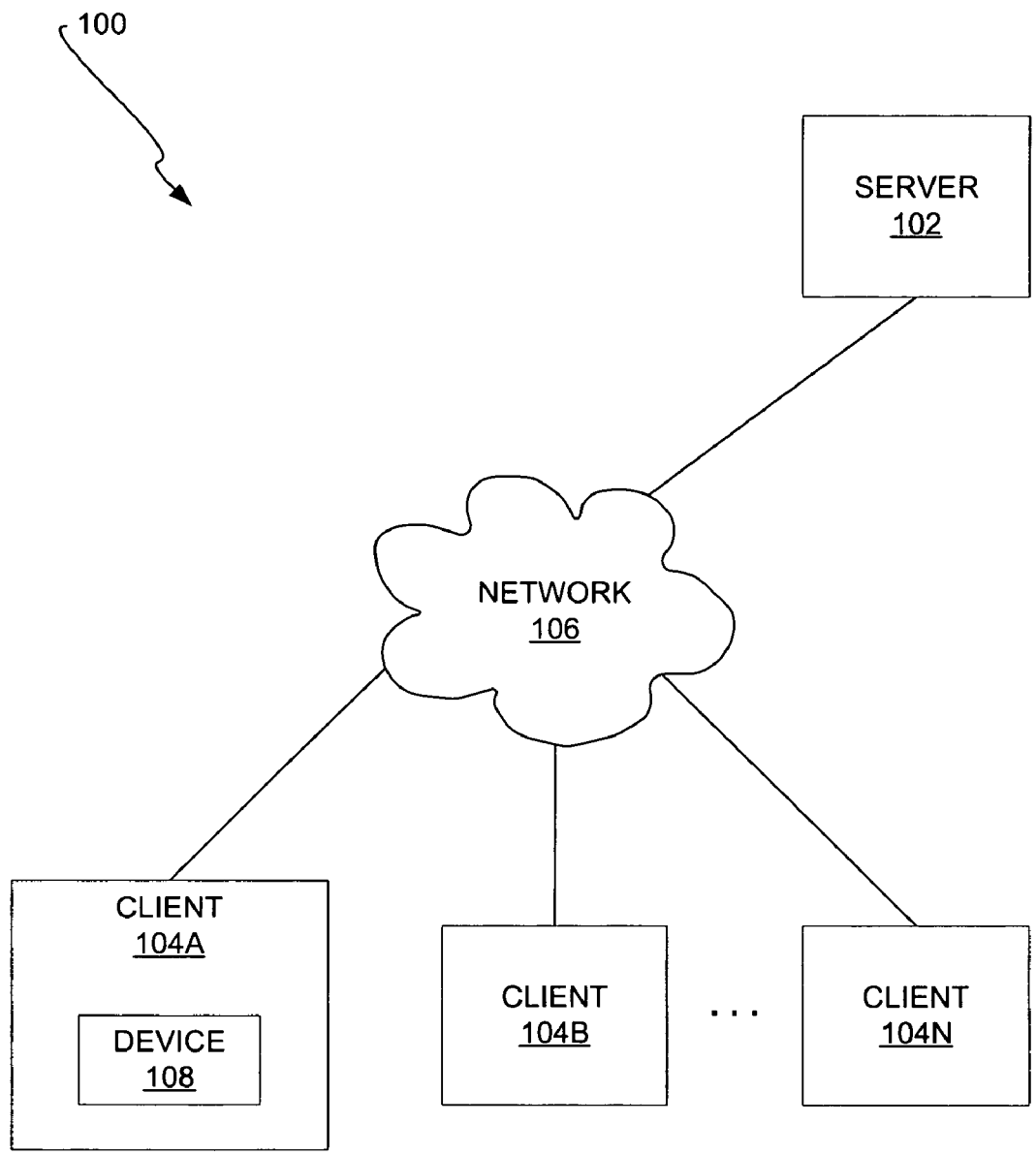

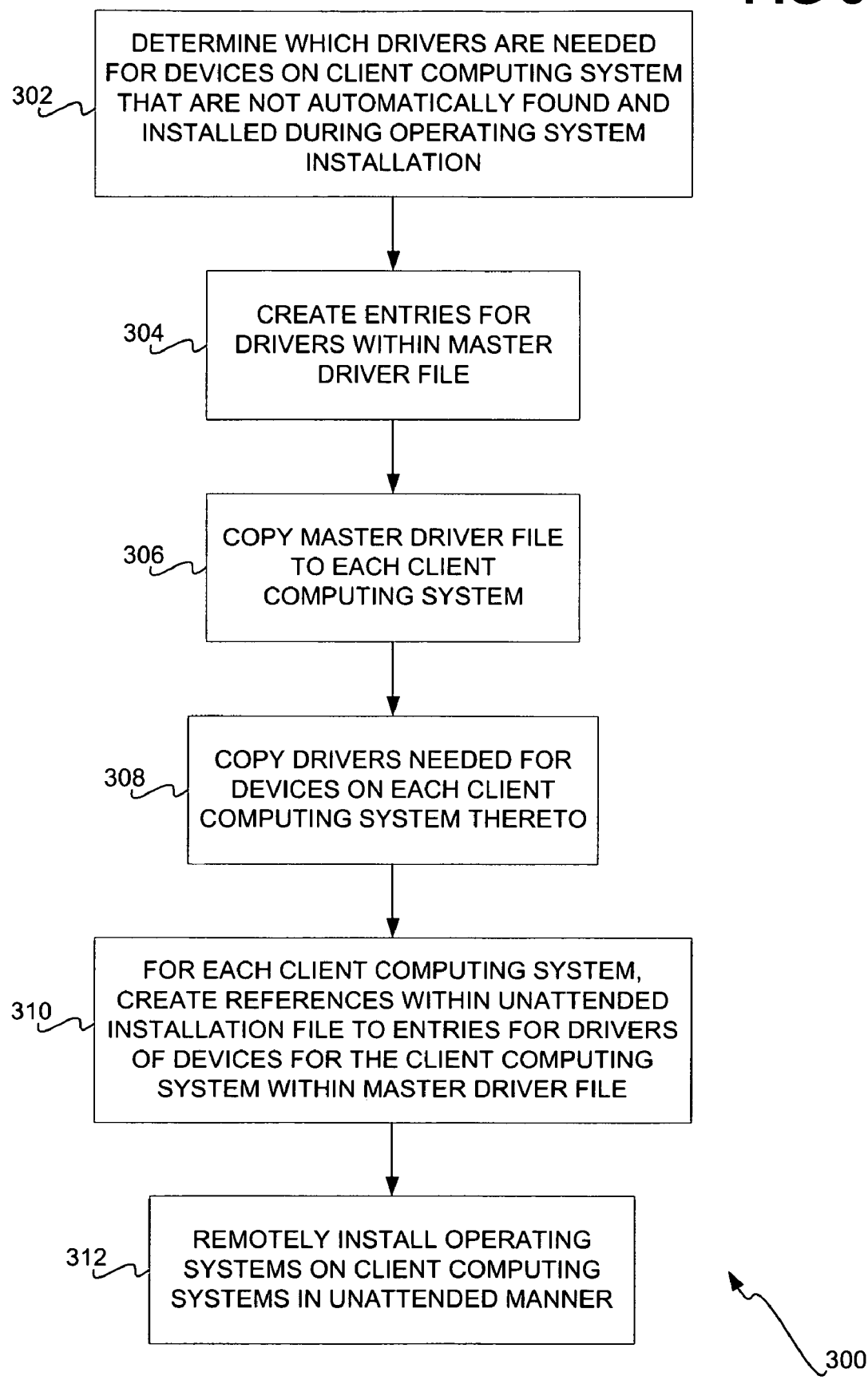

UNATTENDED INSTALLATION OF DRIVERS FOR DEVICES THAT ARE NOT AUTOMATICALLY FOUND AND INSTALLED DURING OPERATING SYSTEM INSTALLATION

FIELD OF THE INVENTION

The present invention relates generally to installing operating systems on computing systems, and more particularly to unattended installation of operating systems on computing systems.

BACKGROUND OF THE INVENTION

A computing system can be generally defined as a computing device, including any peripherals that are desired to have the computing device operate in a given manner. For instance, a computing system may including a computing device, inclusive of its memory, processor(s), storage devices such as hard disk drives, as well as peripherals, such as keyboards, pointing devices like mice, and so on. Computing systems commonly are interconnected with one another in various topologies, including peer-to-peer networks, in which all the computing systems are client computing systems and no one client computing system handles supervisory or management functionality for any other client computing system. Another topology is the client-server network, in which there is typically a lesser number of server computing systems as compared to client computing systems, where the former systems handle supervisory or management functionality for the latter systems.

In order for a computing system to be functional, usually an operating system has to be installed on the computing system. The operating system can be considered the master control computer program via which other computer programs are able to be executed on the computing system. Many operating systems can be installed on computing systems in a substantially unattended manner. For example, in a client-server network, a server computing system may direct that a given operating system be installed on one or more of the client computing systems. Operating systems may generally be installed in such a manner that drivers for devices on the client computing systems are automatically found and installed on the client computing systems. A driver is generally defined as a computer program that allows the operating system, and hence other computer programs executed on a computing system, to communicate with a given device installed on the computing system. Driver installation, as part of operating system installation, on a computing system in which the drivers are automatically found and installed on the computing system can be referred to as "plug and play" driver installation.

"Plug and play" driver installation greatly simplifies the installation of operating systems on computing systems, especially within an enterprise environment in which operating systems may have to be installed on a large number of computing systems. A server computing system, for instance, may direct that a given operating system be installed on all the client computing systems. The client computing systems usually have access to all the drivers that may be needed during operating system installation. When a specific driver is needed for a given device on a client computing system, the operating system installation process can find the specific driver and install it as necessary, without any input, pre-configuration, or other procedures performed by the network administrator, the client computing system, or the server computing system.

However, some operating systems do not provide for automatically finding and installing drivers for certain types of devices when these operating systems are installed on computing systems. For example, certain versions of the Microsoft Windows® operating system, available from Microsoft Corp., of Redmond, Wash., such as the Microsoft Windows® 2000 operating system, the Microsoft Windows® XP operating system, and the Microsoft Windows® 2003 operating system, do not provide for "plug and play" driver installation for original equipment manufacturer (OEM) mass storage device drivers. Such mass storage devices can include different types of hard disk drives, tape storage devices, optical disc storage devices, and other types of mass storage devices. In particular, mass storage devices that have a Small Computer System Interface (SCSI), as opposed to an Integrated Device Electronics (IDE) interface, may not be able to have their drivers automatically found and installation without previous configuration or other procedures having been performed. Such mass storage devices also include mass storage controllers, such as SCSI controllers, for such devices.

Typically, mass storage devices that are not able to have their drivers installed in a "plug and play" manner instead have to have their drivers particularly specified and listed in configuration files that vary for each type of mass storage device, and even different versions and brands for the same type of mass storage device. For example, to accomplish unattended installation of drivers for mass storage devices of client computing systems within a client-server network, the devices may have to be particularly specified in an unattended installation file that is specific to each client computing system. Furthermore, the unattended installation file may have to reference a master driver file that lists the actual files needed to install a driver for each mass storage device on each client computing system, and which also has to be manually prepared and configured. Finally, the driver files also have to be particularly copied to the client computing systems for unattended installation of drivers for the mass storage devices to properly occur.

Thus, for unattended operating system installation within a client-server network to occur where the client computing systems include mass storage devices for which drivers cannot be installed in a "plug and play" manner, for each client computing system a network administrator has to perform a significant amount of work. Such an inordinate amount of work to be performed by a network administrator may further be complicated, and difficult to perform correctly. As a result, many network administrators, while desiring unattended operating system installation on their client computing systems, decide instead to manually install operating systems on the client computing systems, which increases costs and places greater burdens on the network administrators. For these and other reasons, therefore, there is a need for the present invention.

SUMMARY OF THE INVENTION

The present invention relates to the unattended installation of drivers for devices that are not automatically found and installed during operating system installation. A method of the present invention determines which drivers are needed for devices on client computing systems that are not automatically found and installed on them during vendor-specified operating system installation. Entries for the drivers are created within a master driver file. For each client computing system, references are created within an unattended installation file for the client computing system to the entries for the drivers of the devices for the client computing system within the master driver file.

Another method of the present invention further copies the master driver file to each client computing system, as well as the drivers that are needed for the devices on each client computing system. Operating systems are then remotely installed on the client computing systems in an unattended manner. The drivers of the devices for the client computing systems are able to be installed in the unattended manner due to the references created within the unattended installation files to the entries for the drivers of the devices within the master driver file.

A system of the present invention includes client computing systems and a server computing system. Each client computing system has one or more devices that are not automatically found and installed thereon during vendor-specified operating system installation. The server computing system has installed thereon a master driver file within which entries for drivers for the devices of each client computing system are created. Each client computing system has an unattended installation file within which the server computing system creates references to the entries for the drivers of the devices for the client computing system within the master driver file.

A server computing system of the present invention is communicatively connected to a number of client computing systems. The server computing system includes means for determining which drivers are needed for devices on the client computing systems that are not automatically found and installed thereon during vendor-specified operating system installation. The server computing system also includes means for creating entries for the drivers within a master driver file, as well as means for creating references for each client computing system within an unattended installation file for the client computing system to the entries for the drivers of the devices for the client computing system within the master driver file.

An article of manufacture of the present invention includes a computer-readable medium. The computer-readable medium includes means in the medium. The means is for creating entries within a master driver file for drivers that are needed for devices on client computing systems that are not automatically found and installed thereon during vendor-specified system installation. The means is further for creating references for each client computing system within an unattended installation file for the client computing system to the entries for the drivers of the devices for the client computing system within the master driver file.

Embodiments of the invention provide for advantages over the prior art. Unattended operating system installation is provided for by the present invention, even where the client computing systems on which operating systems are to be installed have devices for which drivers are not automatically found and installed during vendor-specified operating system installation. For instance, in the context of installing the Microsoft Windows® 2000 operating system, the Microsoft Windows® XP operating system, or the Microsoft Windows® 2003 operating system on computing systems having mass storage devices for which the operating system does not have built-in drivers, the present invention nevertheless allows for unattended installation of the operating system. In an enterprise environment where there is a large number of client computing systems, the present invention thus enables a network administrator to easily install operating systems on the client computing systems in an unattended manner, without having to divert significant resources or expend significant time and cost for such installation.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of a system including a server computing system and a number of client computing systems, at least one of which includes a device that is not automatically found and installed during operating system installation, according to an embodiment of the invention.

FIG. 3 is a flowchart of a method for enabling unattended installation of drivers for devices that are not automatically found and installed during operating system installation, according to an embodiment of the invention.

DETAILED DESCRIPTION OF THE DRAWINGS

Figure 2A:
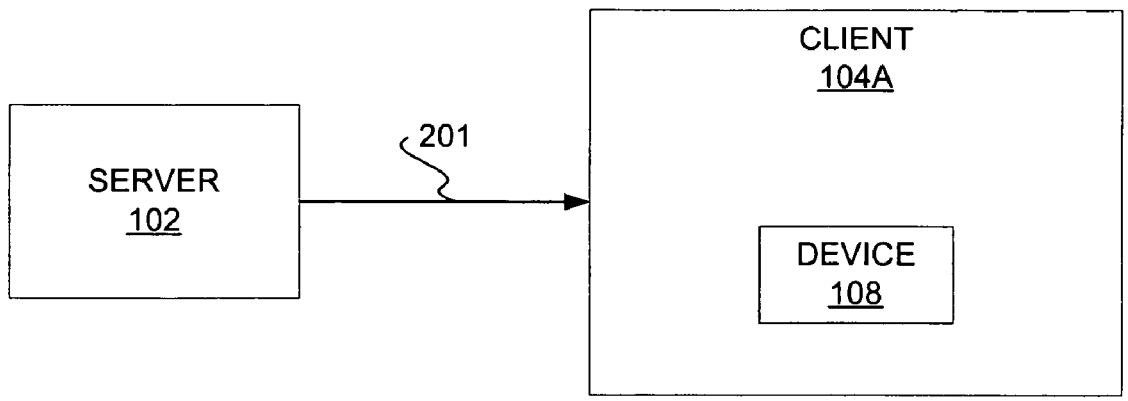
FIGS. 2A-2E are diagrams illustratively depicting the process performed to enable unattended installation of drivers for devices that are not automatically found and installed during operating system installation, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Representative System

FIG. 1 shows a system 100, according to an embodiment of the present invention. The system 100 includes a server computing system 102 that is communicatively connected to a number of client computing systems 104A, 104B, . . . , 104N, collectively referred to as the client computing systems 104, via a network 106. The system 100 is thus arranged in a client-server network topology. The server computing system 102 handles supervisory or management functionality for the client computing systems 104. In the context of an embodiment of the invention, the server computing system 102 is responsible for installing operating systems on the client computing systems 104, such as versions of the Microsoft Windows® operating system available from Microsoft Corp., of Redmond, Wash.

Each of the server computing system 102 and the client computing systems 104 may be generally defined as a computing device, including any peripherals that are desired to have the computing device operate in a given manner. For instance, each of the server computing system 102 and the client computing systems 104 may include a computing device, inclusive of its memory, processor(s), storage devices such as hard disk drives, as well as peripherals, such as keyboards, pointing devices like mice, and so on. The network 106 via which the server computing system 102 communicates with the client computing systems 104 may include one or more of local-area networks (LAN's), wide-area networks (WAN's), intranets, extranets, the Internet, wired networks, wireless networks, telecommunications networks including cellular phone and land-line networks, as well as other types of networks.

The client computing system 104A is depicted in exemplary detail in FIG. 1 as including a device 108. The device 108 is specifically one that is not automatically found, and a driver therefore not automatically installed, during vendor-specified operating system installation on the client computing system 104A. For example, the operating system to be installed on the client computing system 104A may be the Microsoft Windows® 2000 operating system, the Microsoft Windows® XP operating system, or the Microsoft Windows® 2003 operating system. If the device 108 is a type of mass storage device for which non-standard drivers, such as Original Equipment Manufacturer (OEM) drivers, are required, then installation of the operating system in accordance with the specifications set forth by Microsoft Corp. will not result in the device 108 being automatically found, and a driver automatically installed for the device 108. Rather, manual installation of the driver for the device 108 may be required, or difficult and time-consuming configuration of the operating system installation process, which diverges from the vendor-specified manner for such operating system installation, may be required.

Illustrated Description of Unattended Installation of Drivers

FIGS. 2A-2E are diagrams illustratively depicting an overview of the process performed to enable unattended installation of drivers for devices that are not automatically found and installed during operating system installation, according to an embodiment of the invention. FIGS. 2A-2E reference the server computing system 102 and the client computing system 104A of FIG. 1. However, the network 106 of FIG. 1 over which the server computing system 102 and the client computing system 104A communicate is omitted from FIGS. 2A-2E for illustrative clarity. Furthermore, the description made with reference to FIGS. 2A-2E provides a general overview of an embodiment of the present invention. A more detailed description of an embodiment of the present invention, with specific respect to versions of the Microsoft Windows® operating system, is provided in the next section of the detailed description.

In FIG. 2A, the server computing system 102 determines which drivers are needed for the device 108 of the client computing system 104A. This determination includes the server computing system 102 scanning the hardware on the client computing system 104A to learn of devices, such as the device 108, that are not automatically found and installed on the client computing system 104A during operating system installation, as indicated by the arrow 201. As has been noted, the device 108 may be a type of mass storage device for which drivers are not normally automatically installed during operating system installation on the client computing system 104A.

Figure 2B:
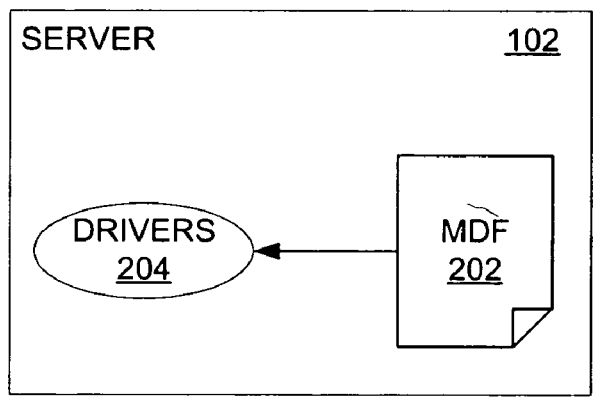

In FIG. 2B, the server computing system 102 creates entries within a master driver file for the drivers 204 for the device 108 of the client computing system 104A. There may be one or more of the drivers 204, where a driver is generally defined as a computer program that allows the operating system, and hence other computer programs executed on a computing system, to communicate with a given device installed on the computing system. In one embodiment, entries within the master driver file 202 for the drivers 204 for the device 108 are created only where such entries are not already present within the master driver file 202. The master driver file 202 is stored on the server computing system 102. The master driver file 202 may in one embodiment be a text file that lists a number of devices, such as the device 108, and the drivers and the locations of the drivers for these devices. The master driver file 202 is preferably general to all of the client computing systems 104 of FIG. 1, and not just the client computing system 104A, such that the devices listed in the master driver file 202, and the drivers for those devices, are for all of the client computing systems 104 of FIG. 1, and not just those of the client computing system 104A.

Figure 2C:
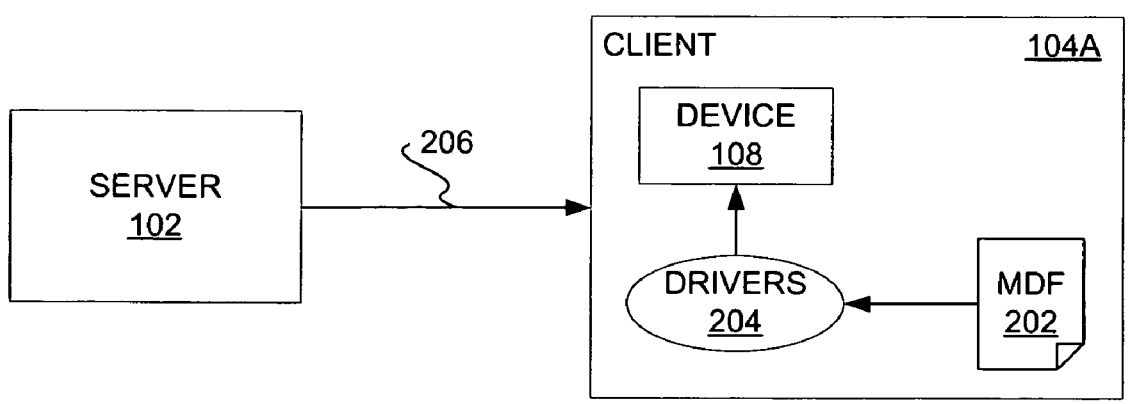

In FIG. 2C, the server computing system 102 copies the drivers 204 for the device 108 and the master driver file 202, as has had entries created therein to the drivers 204 and the device 108, to the client computing system 104A, as indicated by the arrow 206. In one embodiment, the entire master driver file 202 is copied from the server computing system 102 to the client computing system 104A. In another embodiment, only those parts of the master driver file 202 that include the entries for the drivers 204 for the device 108 are copied from the server computing system 102 to the client computing system 104A.

Figure 2D:
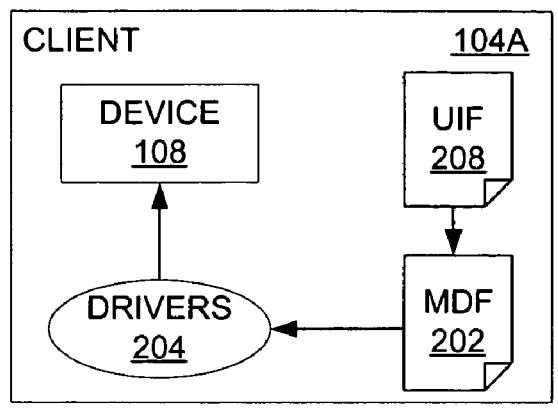

In FIG. 2D, references within an unattended installation file 208 are created to the entries of the master driver file 202 for the drivers 204 for the device 108 of the client computing system 104A. The unattended installation file 208 may be created and/or modified either at the server computing system 102, and copied to the client computing system 104A, or at the client computing system 104A by the server computing system 102. The unattended installation file 208 may also be referred to as an answer file, and contains the values, or answers, needed by the operating system installation process to completely install the operating system on the client computing system 104A without requiring user interaction. Like the master driver file 202, the unattended installation file 208 is in one embodiment a text file. The references within the unattended installation file 208 can list the devices in the entries created within the master driver file 202, as well as the drivers within those entries. During operating system installation, when such references are encountered, the operating system installation process will look to the master driver file 202 to determine further information regarding these devices and drivers, such as where the drivers are located for installation.

Figure 2E:
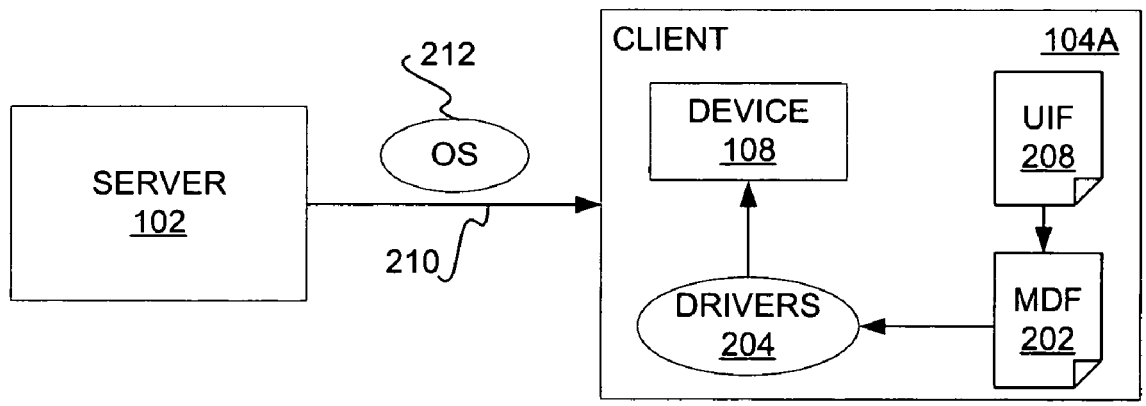

Finally, in FIG. 2E, the server computing system 102 remotely installs an operating system 212 on the client computing system 104A, as indicated by the arrow 210. The unattended installation file 208 is used to install the operating system 212 on the client computing system 104A in an unattended manner. Furthermore, the drivers 204 for the device 108 are able to be installed in an unattended manner, due to the references created within the unattended installation file 208 to the entries for these drivers within the master driver file 202. In other words, by virtue of the unattended installation file 208 referencing the entries for the drivers 204 for the device 108, during operating system installation on the computing system 104A, the drivers 204 for the device 108 are properly installed on the computing system 104A along with the operating system that is being installed thereon.

Method for Unattended Installation of Drivers

FIG. 3 shows a method 300 for providing unattended installation of drivers for devices that are not automatically found and installed during operating system installation, according to an embodiment of the invention. The method 300 is consistent with but more detailed than the embodiment of the invention described in relation to FIGS. 2A-2E in the previous section of the detailed description. More specifically, the method 300 is described in relation to installation of the Microsoft Windows® 2003 operating system on a client computing system. The method 300 may be performed by the server computing system 102 of FIG. 1, in relation to any of the client computing systems 104 of FIG. 1, such as specifically the client computing system 104A that includes the device 108 for which drivers are not automatically found and installed during operating system installation on the client computing system 104A. The method 300 may further be implemented at least partially as means within a computer-readable medium of an article of manufacture, where the medium may be a recordable data storage medium, a modulated carrier signal, or another type of computer-readable medium.

First, which drivers are needed for devices on client computing systems that are not automatically found and installed during vendor-specified operating system installation are determined (302). As has been described, in the context of the Microsoft Windows® 2003 operating system, such devices may include mass storage devices. To determine which drivers are needed, the devices on the client computing systems are first discovered, by scanning the hardware on the client computing systems.

Entries for the drivers are created within a master driver file (304), which is general to all of the client computing systems in one embodiment, and which is stored on the server computing system. In the context of the Microsoft Windows® 2003 operating system, the master driver file is a text mode driver file, and may specifically be the file txtsetup.oem. During setup of the operating system installation process, a setup program installs drivers for devices that are needed to boot a client computing system. Although most of these drivers are included with the operating system, as has been noted, some of the drivers, such as those for mass storage devices, are not. Therefore, additional drivers for such devices can be specified during text-mode setup by supplying of the txtsetup.oem file.

The txtsetup.oem file is a text file the contains the following information: a list of the hardware components supported by the txtsetup.oem file; a list of the files to copy for each component; and, a list of registry keys and values to create for each component. The registry is a configuration database found in all thirty-two-bit versions of the Microsoft Windows® system and contains settings for the hardware and software in the computing system on which it is installed. The sections of the txtsetup.oem file use the following general format:
[SectionName]
entry=value1, value2, . . .

The name of the section is enclosed in square brackets. A pound sign or a semicolon character at the beginning of a line indicates a comment. Strings with embedded spaces, commas, or hashes are enclosed in double quotes.

There are at least the following five sections within the txtsetup.oem file: a Disks section, a Defaults section, one or more HwComponents sections, one or more Files.HwComponent.ID sections, and one or more Config.DriverKey sections. The Disks section of the txtsetup.oem file identifies the disks that are to be installed. This section has the following format:

[Disks]
diskN="description", tagfile, directory

The entry diskN specifies a key that can be used in subsequent sections to identify the disk. The description value specifies a string containing the name of the disk. The tagfile value specifies the name of a verification file on the disk. The filename is specified as a full path from a root directory, and its existence is verified to ensure that the drivers are present. The directory value specifies the directory on the disk where the installation files, such as the drivers, are located. The directory is also specified as a full path from a root directory. An example of the Disks section is as follows:
[Disks]
disk1="OEM SCSI driver disk 1", \disk1.tag,\
The Defaults section lists the default driver(s) for each hardware component supported by the txtsetup.oem file. This section has the following format:
[Defaults]
component=ID The entry component specifies a hardware component supported by the txtsetup.oem file. This component either has a value of computer or scsi in the context of installation of the Microsoft Windows 2003® operating system. The ID value specifies a string that identifies the default option. The string matches to an ID in the corresponding HwComponent section. An example of the Defaults section is as follows:
[Defaults]
SCSI=oemscsi
The HwComponents section of the txtsetup.oem file lists the description of each ID specified in the Defaults section. This section has the following format:
[HwComponentValue]
HwComponentID="description"

The moniker HwComponentValue corresponds to the value of computer or scsi in the context of installation of the Microsoft Windows 2003® operating system. The entry HwComponentID corresponds to the ID value specified in the Defaults section, and the description key provides a text string that is the description of this ID value. An example of the HwComponents section is as follows:
[SCSI]
oemscsi="OEM Fast SCSI Controller"
A Files.HwComponent.ID section in the txtsetup.oem file lists the files to be copied when this particular component option is installed. One of these sections is present for each option listed in each HwComponent section. This section has the following format:
[Files.HwComponent.ID]
filetype=diskN, filename[, DriverKey]

HwComponent corresponds to the name of a HwComponent section in the file, whereas ID corresponds to an ID entry in that HwComponent section. The entry filetype identifies the type of the file to be copied. One of these entries is present for each file to be copied for this HwComponent.ID. The filetype is one of the following system-defined values: driver, dll, hal, inf, catalog, and detect.

The driver value is valid for all components, and specifies the file is to be copied to the directory %systemroot%\system32\drivers. The dll value is valid for all components, and specifies the file is to be copied to the directory %systemroot%\system32. The hal value is valid only for the computer component, and specifies the file is to be copied to %systemroot%\system32\hal.dll for x86 processor-based client computing systems, or to \os\winnt\hal.dll, for non-x86 processor-based client computing systems. The inf value is valid for all components, specifies an INF file for the device, and specifies that the file is to be copied to the directory %systemroot%\system32. An INF file is a file that contains installation information. The catalog value is valid for all drivers, and specifies a catalog file for a device. The catalog value is not required for any component. The detect value is valid for the computer component only, and only for x86 processor-based client computing systems. If specified, it replaces a standard x86 hardware recognizer, which is copied to %systemroot%\ntdetect.com.

The diskN value within the Files.HwComponent.ID section identifies the disk from which to copy the file, and matches an entry within the Disks section. The filename value specifies the name of the file, not including the directory path or drive. To form the full file name, the operating system installation process appends the filename to the directory specified for the disk in the Disks section. Finally, the Driver-Key value specifies the name of the key to be created in the registry for this file, if the file is of type driver. This value is used to form Config.DriverKey section names, and is required for components of the type scsi. An example of the Files.HwComponent.ID section of the txtsetup.oem file is as follows:

[Files.SCSI.oemscsi]
driver=d1, oemfs2.sys, OEMSCSI
inf=d1, oemset.inf
dll=d1, oemdrv.dll
catalog=d1, oemdrv.cat The Config.DriverKey section of the txtsetup.oem file specifies values to be set in the registry for particular component options. The operating system installation process automatically creates the required values within a Services\DriverKey key in the registry. This section is thus used to specify additional keys to be created under the Services\DriverKey portion of the registry, as well as values under the Services\DriverKey and Services\DriverKey\subkey_name portions of the registry. This section has the following format:

[Config.DriverKey]
value=subkey_name, value_name, value_type, value

The subkey_name value specifies the name of a key under the Services\DriverKey tree within the registry where the specified value is placed. If the subkey_name is an empty string, the value is placed under the Services\DriverKey tree. The subkey_name can specify more than one level of a subkey. The value_name key specifies the name of the value to be set. The value_type key specifies the type of the registry entry to be created. The value_type can be one of the following: REG_DWORD, REG_SZ or REG_EXPAND_SZ, REG_BINARY, and REG_MULTI_SZ.

For the REG_DWORD type, one value is allowed, which is a string containing up to eight hexadecimal digits. For the REG_SZ type or the REG_EXPAND_SZ type, one value is allowed, and is interpreted as a zero-terminated string to be stored. For the REG_BINARY type, one value is allowed, which is a string of hex digits, each pair of which is interpreted as a byte value. Finally, for the REG_MULTI_SZ type, multiple value arguments are allowed, each of which is interpreted as a component of the MULTI_SZ string. Finally, the value within the Config.DriverKey section specifies the actual value, depending on the type specified in value_type. An example of the Config.DriverKey section of the txtsetup.oem file is as follows:

[Config.OEMSCSI]
value=parameters\PnpInterface,5,REG_DWORD,\1

Still referring to FIG. 3, after the entries for the drivers have been created within the master driver file, the master driver file is copied to each client computing system (306), as well as the drivers for the devices on each client computing system (308). The master driver file may be copied in its entirety to each client computing system, or only those parts of the master driver file needed by a given client computing system may be copied to the client computing system. Next, for each client computing system, references within an unattended installation file are created to the entries for the drivers of the devices for the client computing system within the master driver file (310). In the context of the Microsoft Windows® 2003 operating system, the unattended installation file is an operating system installation answer file, which is particular to each client computing system, and may specifically by the unattend.txt file.

The unattend.txt file is a text file that generally includes section headers, parameters, and values for those parameters. Most of the section headers are predefined, although some may be user-defined. It is not necessary to specify all the possible parameters and keys in the unattend.txt file if the installation does not require them. The file format for the unattend.txt file is as follows:

[section1]
key=value

In the context of an embodiment of the invention in which the devices for which drivers are not automatically installed during vendor-specified operating system installation are mass storage devices, there are two relevant sections in the unattend.txt file:

MassStorageDrivers and OEMBootFiles.

The MassStorageDrivers section contains a list of Small Computer System Interface (SCSI) drivers to be loaded and installed. An example of the MassStorageDrivers section is as follows:
[MassStorageDrivers]
"Brand SCSI 5.5"="OEM"

The string "Brand SCSI 5.5" is a multiple mass storage driver description that identifies the driver to be installed, and matches one of the strings defined in the right-hand side of the [SCSI] section of the txtsetup.oem file, as has been described. Multiple mass storage driver descriptions can be provided. The value "OEM" indicates that the driver is supplied by an Original Equipment Manufacturer (OEM), as opposed to by Microsoft Corp. itself as part of the operating system, in which case the value would instead be "RETAIL".

The OEMBootFiles section is used to specify OEM-supplied boot files, or driver files. The files listed in the OEMBootFiles section are placed in a $OEM$\Textmode directory. An example of the OEMBootFiles section is as follows:

[OEMBootFiles]
txtsetup.oem
scsi55.sys
scsi55.inf

The string "Brand SCSI 5.5" in the MassStorageDrivers section must match the exact string of a driver name that is found in the txtsetup.oem file. In this way, references are created in the unattended installation file to drivers found in the txtsetup.oem file. In particular, the txtsetup.oem file is specified in the OEMBootFiles section, and strings are added in the MassStorageDrivers section, in the form of "string"="OEM", where the value string matches a driver name found in the txtsetup.oem file. The entries scsi55.sys and scsi55.inf reference driver files for the device to which this section pertains.

Still referring to FIG. 3, the method 300 concludes by remotely installing the operating system on the client computing systems in an unattended manner (312). The drivers of the devices for the client computing systems are able to be installed in an unattended manner, due to the references created within the unattended installation files to the entries for the drivers of these devices within the master driver file. Network administrators are therefore spared the time and expense of having to manually install operating systems on the client computing systems, and the complexity of attempting to manually configure the master driver file and the unattended installations files themselves.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Embodiments of the invention may, for instance, be implemented in accordance with the Linux operating system, as well as other operating systems. It is manifestly intended that this invention be limited only by the claims and equivalents thereof.

We claim:

1. A method comprising:
   determining, by a server computing system responsible for installing operating systems on client computing systems, which drivers are needed for devices on the client computing systems that are not automatically found and installed on the client computing systems during vendor-specified operating system installation on the client computing systems;
   creating without user interaction, by the server computing system, entries for the drivers within a master driver file that are not already present within the master driver file as stored on the server computing system; copying the master driver file to each client computing system; copying the drivers that are needed for the devices on teach client computing system to the client computing system;
   for each client computing system, creating references within an unattended installation file for the client computing system to the entries for the drivers of the devices for the client computing system within the master driver file as copied to the client computing system, by the server computing system,
   wherein the unattended installation file is a different file than the master driver file is.

2. The method of claim 1, wherein determining which drivers are needed for the devices on the client computing systems that are not automatically found and installed on the client computing systems during operating system installation comprises determining which drivers are needed for mass storage devices on the client computing systems that are not automatically found and installed on the client computing systems during vendor-specified operating system installation.

3. The method of claim 1, wherein determining which drivers are needed for the devices on the client computing systems that are not automatically found and installed on the client computing systems during operating system installation comprises remotely scanning hardware on the client computing systems to learn of the devices that are not automatically found and installed on the client computing systems during operating system installation.

4. The method of claim 1, wherein copying the master driver file to each client computing system comprises copying the master driver file in its entirety to each client computing system.

5. The method of claim 1, wherein copying the master driver file to each client computing system comprises, for each client computing system, copying only those parts of the master driver file that include the entries for the drivers that are needed for the devices on the client computing system.

6. The method of claim 1, wherein the master driver file is a text mode driver file.

7. The method of claim 1, wherein the unattended installation file for each client computing system is an operating system installation answer file for the client computing system.

8. A method comprising:
   determining, by a server computing system responsible for installing operating systems on client computing systems, which drivers are needed for devices on the client computing systems that are not automatically found and installed on the client computing systems during vendor-specified operating system installation on the client computing systems;
   creating without user interaction, by the server computing system, entries for the drivers within a master driver file that are not already present within the master driver file as stored on the server computing system;
   copying the master driver file to each client computing system;
   copying the drivers that are needed for the devices on each client computing system to the client computing system;
   for each client computing system, creating references within an unattended installation file for the client computing system to the entries for the drivers of the devices for the client computing system within the master driver file as copied to the client computing system, by the server computing system; and,
   remotely installing operating systems on the client computing systems in an unattended manner, where the drivers of the devices for the client computing systems are able to be installed in the unattended manner due to the references created within the unattended installation files to the entries for the drivers of the devices within the master driver file,
   wherein the unattended installation file is a different file than the master driver file is, and wherein the devices on client computing systems that are not automatically found and installed on the client computing systems during vendor-specified operating system installation on the client computing systems are mass storage devices.

* * * * *

UNITED STATES PATENT AND TRADEMARK OFFICE
CERTIFICATE OF CORRECTION

PATENT NO. : 7,660,847 B2  Page 1 of 1
APPLICATION NO. : 10/800975
DATED : February 9, 2010
INVENTOR(S) : Bezanson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1701 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,847 B2 | Page 1 of 1 |
| APPLICATION NO. | : 10/800975 | |
| DATED | : February 9, 2010 | |
| INVENTOR(S) | : James T. Bezanson et al. | |

It is certified that error appears in the above-identified patent and that said Letters Patent is hereby corrected as shown below:

Title Page:
In item (75) identifying the inventors, the third and last inventor Rhonda V. Seiber Doane is misspelled as Rhonda V. Seiher Doane. That is, the "b" in "Seiber" is incorrectly listed as an "h" on the first page of the issued patent.

Signed and Sealed this
Twenty-eighth Day of January, 2014

Michelle K. Lee
*Deputy Director of the United States Patent and Trademark Office*